Figure 1:
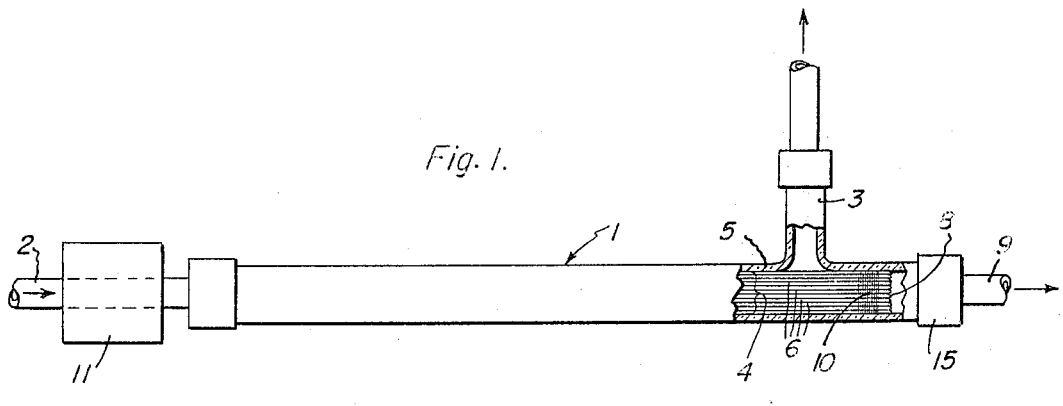

Inventor:
Ralph J. Bondley
by John P. Dellitt
His Attorney.

United States Patent Office 3,269,817
Patented August 30, 1966

3,269,817
MANUFACTURE OF HELIUM SEPARATION
APPARATUS
Ralph J. Bondley, Scotia, N.Y., assignor to General Electric Company, a corporation of New York
Filed Dec. 26, 1963, Ser. No. 333,453
4 Claims. (Cl. 65—4)

This invention relates to an improved method of manufacturing helium separation apparatus and particularly to a method of manufacturing such apparatus for operation at high gaseous temperatures.

The phenomena of diffusion of helium through a vitreous material such as quartz or glass is well known. This diffusion takes place in appreciable quantities if a large surface of thin vitreous material is exposed to a gaseous environment containing helium. Helium separation devices employing this phenomenon have been developed wherein a large number of glass, thin-walled capillary tubes act as a helium diffusion membrane or helium molecular sieve. In such apparatus the outside of said tubes is exposed to a gaseous environment containing helium, as for example, in a natural gas main. Helium diffusing into the inside of the tubes is then withdrawn therefrom in an output system communicating only to the interior of the tubes. In the usual apparatus of this type, a large number of thin capillary tubes are gathered together with a considerable portion of their length (and closed ends) extending into a passage through which natural gas flows. The remaining, open ends of the tubes are joined at a common header or barrier allowing communication only from the inside of the tubes to an output chamber for collecting the helium.

According to the usual construction of such a device, the aforementioned header arrangement is formed including an organic sealing substance, such as an epoxy resin or the like, for filling the interstices between the tube's outer surfaces at the helium-output end of the device so the natural gas around the exterior of the tubes will not flow into helium collecting system. However, the efficiency of helium separation apparatus increases with temperature; that is to say, helium diffusion in general increases as the temperature of the natural gas increases. Therefore the natural gas is desirably heated to a temperature permitting a high degree of helium diffusion through the capillary tubes. High temperatures have a deleterious effect upon resin sealing the outside of the vitreous tubes together at the helium-output end, frequently resulting in resin decomposition. Furthermore, all resins are somewhat permeable to gases and therefore some leakage must be expected especially after long use. If the gas is heated, cooling means must be applied to the resin seal.

Therefore, it is an object of the present invention to provide an improved method of manufacturing helium separation apparatus which is capable of withstanding high temperatures.

It is another object of the present invention to provide an improved method of manufacturing helium separation apparatus which is substantially leak-proof.

In accordance with one embodiment of the present invention, hollow vitreous tubes with both ends closed and with gas purposely trapped therein, are gathered together into a closely packed sheaf. One end of the sheaf is then heated to a softened condition while expansion of the tubes as a group is restrained. The gas pressure generated within the tubes forces the tubes to expand individually or dilate towards one another filling the space between the tubes at their heated end. The end of the tubes where they are compacted together is then opened in order to provide a helium outlet. The tubes in expanding toward one another at a common end form their own header in this manner without the use of organic sealing substances or the like.

In accordance with a variation of the present invention, powdered glass material or the like is disposed between the closed ends of the tubes when heated. Heating, in addition to causing expansion of the tubes toward one another, also melts the powdered glass material for insuring closure of the space between the tubes.

Figure 2:
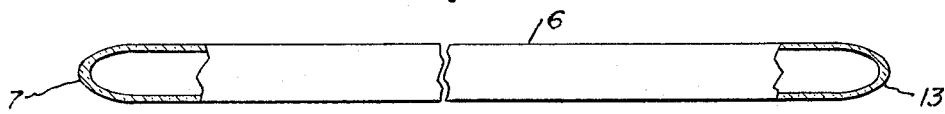
Figure 4:
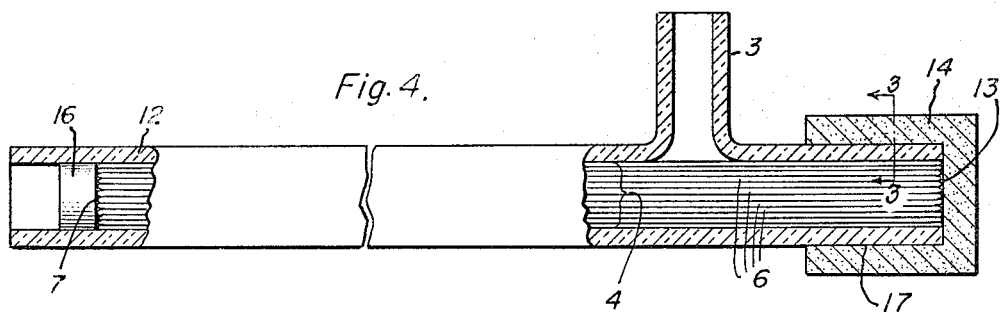
Figure 3:
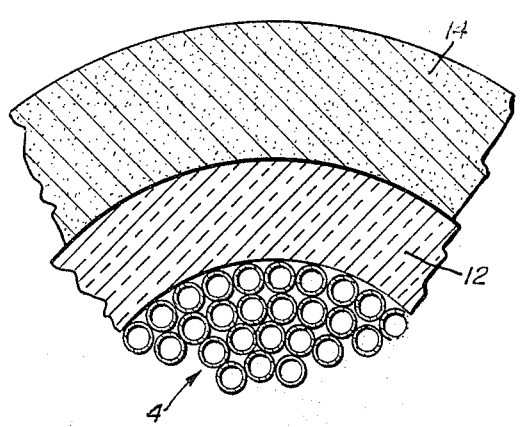
Figure 5:
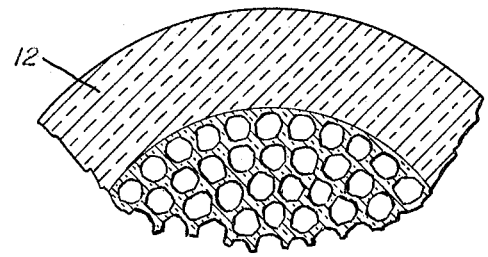

The subject matter which I regard as my invention is particularly pointed out and distinctly claimed in the concluding portion of this specification. The invention, however, both as to organization and method of operation, together with further objects and advantages thereof, may best be understood by reference to the following description taken in connection with the accompanying drawings wherein like reference characters refer to like elements and in which:

FIG. 1 is a side view partially broken away of a helium separation apparatus,

FIG. 2 is a hollow vitreous capillary tube of the type used in the FIG. 1 apparatus, FIG. 3 is a cross-section of a portion of this type of apparatus, FIG. 4 illustrates a portion of a method in accordance with the present invention for manufacturing a helium separation apparatus, and FIG. 5 is a cross-section of a plurality of hollow vitreous capillary tubes after a heating step of a method illustrated in FIG. 4.

The method of the present invention relates to the manufacture of helium separation apparatus, used in separating helium from natural gas or the like. In FIG. 1, such an apparatus 1 is connected in a gas line having an inlet at 2 and an outlet at 3. The apparatus 1 includes a multiplicity of substantially round, hollow, thin-walled vitreous tubes 6 in a sheaf 4 closely packed inside a hollow pipe 5. One of such tubes is illustrated in FIG. 2, while the sheaf or grouping of such tubes is illustrated in enlarged cross-section in FIG. 3. First ends of these tubes are disposed in the direction of gas inlet 2 and are closed as illustrated at 7 in FIG. 2, while the remaining ends at 8 in FIG. 1 are opened so the interior of the tubes communicate with helium outlet 9 through a pipe coupling 15. In typical apparatus a header 10 formed of epoxy resin or the like prevents passage of gas between the outside of the tubes to helium outlet 9.

In operation of the FIG. 1 device, natural gas or the like under pressure enters through inlet 2 and passes between the tubes 6 before leaving at outlet 3. As the gas passes between the tubes, helium contained in the natural gas will diffuse through the tubes. No gas besides helium diffuses through the vitreous tubes to any material extent except a very limited amount of hydrogen; however, hydrogen is present in natural gas in very low concentrations. The helium inside the tubes passes out through open ends 8 of tubes 6 into a helium collection system connected to outlet 9.

In order to increase the efficiency of helium extraction, heating of the inlet gas is highly desirable and may be conveniently accomplished employing pre-heater 11 in the input gas line. A gas temperature of 500° C. or greater is advantageous. Unfortunately temperatures in this range have a deleterious effect upon the header seal at 10, usually formed of an epoxy resin or the like. These temperatures tend to produce decomposition of the resin as well as gas leakage into the helium outlet.

In accordance with the present invention, the problems connected with this type of organic sealing are eliminated in providing a seal at the outlet end of the vitreous tubes formed by the tubes themselves. Referring to FIG. 4, a sheaf of hollow, thin-walled vitreous tubes 4 of substantially uniform length are closely packed in a relatively heavy-walled vitreous pipe 12, with tube ends 13 approximately flush with outlet end 17 of pipe 12. A quartz plug 16 is temporarily inserted at the opposite end of the pipe to restrain tube movement. Each of the tubes is closed at each end as illustrated at 7 and 13 in FIG. 2, as by heating in a flame, and such closing is accomplished at a time when the tubes are exposed to the atmosphere or other gaseous environment whereby gases are trapped within each tube.

The hollow vitreous tubes 6 are preferably cylindrical and of very small diameter, e.g. from 0.002 to 0.010 inch in outside diameter and having a wall thickness of approximately 10 percent of the diameter, although larger tubes may be used if desired. The tube material is preferably quartz or high silica glass, since quartz allows maximum diffusion of helium therethrough. Pipe 12 is also desirably formed of quartz.

The outlet end 17 of pipe 12 is then closely fitted into a cap 14 formed of a material capable of exhibiting considerable mechanical strength while conducting heat at high temperatures, graphite being appropriate. The sheaf of tubes 4 is extended to the end of pipe 12 and approximately to the end of cap 14. Cap 14 is then heated to a high temperature at which temperature the ends of the tubes within the cap become softened, for instance at a temperature of about 1500° C. in the case of quartz tubes. Preferably this heating is carried out in an evacuated enclosure, not shown. As the vitreous tube material of the tubes within cap 14 becomes softened, the gas pressure builds up inside the tubes causing the tube walls to expand outwardly toward one another forming a tightly compacted cellular structure with each other and with pipe 12. The maximum heat should be applied to the end of cap 14; however, the rest of the cap and the length of pipe 12 should be heated to some degree to aid in gas expansion within the tubes. During heating and expansion of the tubes, the tubes are restrained from expanding outwards as a group by the circumferential restraint of cap 14. The closed end of cap 14 as well as plug 16 prevent lengthways expansion of the tubes. The cellular structure formed by the expanded tubes is shown in cross-section in FIG. 5. The tubes are seen to be somewhat expanded or dilated in comparison to the FIG. 3 cross-section and may take on irregular shapes. However, no space remains between the tubes through which a gas leak may occur. The tubes form their own header in this manner.

The end 17 of pipe 12 within cap 14 is now ground back, or this end portion is otherwise cut back or severed, opening an exposed cellular cross-section of tube open ends having the appearance shown in FIG. 5. The remainder of cap 14 may be similarly ground off or removed. Now end 17 of the hollow tube 12 may be joined to helium outlet 9 of the FIG. 1 apparatus as with pipe coupling 15. Inasmuch as the tube header 10 is in effect formed of substantially the same material as the tubes 6, and the material of the enclosing vitreous pipe, no problems of seal deterioration or leakage are experienced during high temperature gas operations.

In accordance with a variation of the invention, the spaces between the vitreous tubes, at the end of the sheaf where compaction is to take place, is filled with a slightly lower melting point vitreous filler material or the like. For example, powdered glass, suspended in a carrier such as alcohol, amyl acetate or toluene, is initially spread into the spaces in between the glass tubes. Then cap 14 is placed over the end of pipe 12 and heated to expand the tubes toward one another as hereinbefore described at the same temperature or at a slightly lower temperature. The powdered glass becomes semi-liquid aiding and insuring a good seal between the tubes.

Various powdered glass materials and the like are suitable for this purpose, for example, quartz grading glass, i.e. alumina silica glass. A glass is appropriate which contains a high degree of silica lending it low expansion characteristics similar to the high-quartz tubes. The glass filler material should melt below the melting point of the vitreous tube material, allowing the filler material to flow freely between the tubes when expansion takes place. Other filler materials having low expansion characteristics and compatibility with quartz may also be used.

While I have shown and described several embodiments of my invention, it will be apparent to those skilled in the art that many changes and modifications may be made without departing from my invention in its broader aspects; and I therefore intend the appended claims to cover all such changes and modifications as fall within the true spirit and scope of my invention.

What I claim as new and desire to secure by Letters Patent of the United States Patent Office is:

1. A method of manufacturing helium separation apparatus comprising the steps of grouping a multiplicity of hollow vitreous tubes into a closely packed sheaf, closing both ends of said tubes trapping gas therein, heating one end of said sheaf of tubes to a softened condition while restraining radial and axial expansion of said tubes as a group causing the gas within said tubes to expand said tubes toward one another to form a compact therebetween filling the space between said tubes, and then opening ends of said tubes where said tubes are compacted together.

2. A method of manufacturing helium separation apparatus comprising the steps of grouping a multiplicity of substantially round gas-contained hollow vitreous tubes with closed ends in a closely packed sheaf within an open ended hollow pipe forming the body of the helium separation apparatus, positioning said tubes within said hollow pipe so that closed first ends of said hollow vitreous tubes are adjacent a first open end of said hollow pipe, placing a close-fitting cap formed of a material capable of exhibiting mechanical strength at high temperatures over said first end of said hollow pipe, heating said cap for the purpose of expanding the gas in said tubes causing said tubes to dilate where heated and compact towards one another filling the space between said tubes at said first end of said pipe, and then removing said cap and cutting back the first ends of said tubes within the length covered by said cap leaving a cellular cross-section for providing communication only to the inside of said tubes.

3. A method of manufacturing helium separation apparatus comprising the steps of grouping a multiplicity of substantially round hollow vitreous tubes into a closely packed sheaf, closing both ends of said tubes trapping gas therein, filling the spaces between said tubes at a first end of said sheaf of tubes with a filler material having low expansion characteristics, and heating said first end of said sheaf of tubes and said added filler material to a softened condition while restraining the radial and axial expansion of said tubes as a group causing gas within said tubes to expand said tubes toward one another to form a compact therebetween, and then opening first ends of said tubes where said tubes are compacted together.

4. A method of manufacturing helium separation apparatus comprising the steps of grouping a multiplicity of substantially round hollow vitreous tubes into a closely packed sheaf, closing both ends of said tubes trapping gas therein, filling the spaces between said tubes at a first end of said sheaf of tubes with an added vitreous material in powdered form, said material having a lower melting temperature than said tubes, and heating the first end of said sheaf of tubes to a softened condition while restraining radial expansion of said tubes as a group causing gas within said tubes to expand said tubes towards one another and causing said added vitreous material to melt forming a compact between said tubes including said added vitreous material, and then opening first ends of said tubes where said tubes are compacted together.

References Cited by the Examiner

UNITED STATES PATENTS

| | | | |
|---|---|---|---|
| 1,926,552 | 9/1933 | Morgan | 65—4 |
| 2,986,847 | 6/1961 | Sato | 65—59 |
| 2,996,419 | 8/1961 | Schmick | 65—4 |
| 3,019,853 | 2/1962 | Kohman et al. | 55—16 |
| 3,188,188 | 6/1965 | Norton | 65—4 |
| 3,226,589 | 12/1965 | Woodcock | 313—89 |

FOREIGN PATENTS 886,043   1/1962   Great Britain.

DONALL H. SYLVESTER, *Primary Examiner.*

G. R. MYERS, *Assistant Examiner.*